(12) United States Patent
Zott

(10) Patent No.: US 9,898,470 B2
(45) Date of Patent: Feb. 20, 2018

(54) TRANSFERRING ARCHIVED DATA

(71) Applicant: Bank of America Corporation, Charlotte, NC (US)

(72) Inventor: Jerome M. Zott, Glastonbury, CT (US)

(73) Assignee: Bank of America Corporation, Charlotte, NC (US)

( * ) Notice: Subject to any disclaimer, the term of this patent is extended or adjusted under 35 U.S.C. 154(b) by 385 days.

(21) Appl. No.: 14/819,108

(22) Filed: Aug. 5, 2015

(65) Prior Publication Data

US 2017/0039201 A1 Feb. 9, 2017

(51) Int. Cl.
*G06F 17/30* (2006.01)

(52) U.S. Cl.
CPC .. *G06F 17/30076* (2013.01); *G06F 17/30073* (2013.01)

(58) Field of Classification Search
USPC ........ 707/640, 661, 674, 689, 821, 600, 687
See application file for complete search history.

(56) References Cited

U.S. PATENT DOCUMENTS

| | | | |
|---|---|---|---|
| 5,727,197 A | 3/1998 | Burgess et al. | |
| 6,049,804 A | 4/2000 | Burgess et al. | |
| 7,107,284 B1 | 9/2006 | Betz et al. | |
| 2008/0027905 A1* | 1/2008 | Jensen .................. | G06F 3/0613 |
| 2011/0082832 A1 | 4/2011 | Vadali et al. | |
| 2013/0339818 A1* | 12/2013 | Baker ..................... | G06F 11/10 |
| | | | 714/763 |
| 2014/0325166 A1* | 10/2014 | Iyigun ................... | G06F 3/0685 |
| | | | 711/158 |
| 2014/0339314 A1* | 11/2014 | Sun ....................... | G06K 19/041 |
| | | | 235/492 |
| 2016/0004603 A1* | 1/2016 | Lakshman .......... | G06F 11/2094 |
| | | | 711/162 |
| 2016/0004611 A1* | 1/2016 | Lakshman .......... | G06F 11/2058 |
| | | | 714/6.23 |

FOREIGN PATENT DOCUMENTS

| EP | 2 270 692 | 6/2010 |
|---|---|---|
| GB | 2509996 | 1/2013 |

* cited by examiner

*Primary Examiner* — Sana Al Hashemi
(74) *Attorney, Agent, or Firm* — Michael A. Springs

(57) ABSTRACT

A system for transferring archived data comprises one or more interfaces, each operable to read data from magnetic storage tape, and one or more processors communicatively coupled to the one or more interfaces and operable to: identify a file stored on a magnetic storage tape, the file having a first format, identify a date associated with the identified file, identify one from a plurality of intermediate platforms based at least in part on the identified date, the intermediate platforms operable to access data from file formats associated with a range of dates, transfer the identified file to the identified intermediate platform, access data in the identified file using the identified intermediate platform, transfer the accessed data from the identified intermediate platform to a contemporary software platform, and store the accessed data in a second format.

20 Claims, 3 Drawing Sheets

| | Date | Time | |
|---|---|---|---|
| 202 | Date | Time | 204 |
| 206 | 10/05/1990 | 17:15:05 | |
| 208 | 10/06/1990 | 17:17:19 | |
| 210 | 10/06/1990 | 17:17:19 | |

TRANSFERRING ARCHIVED DATA

TECHNICAL FIELD

This disclosure relates generally to transferring archived data, and more particularly to transferring archived data from legacy magnetic tape storage to contemporary electronic platforms.

BACKGROUND

Enterprises often archive electronic data for long term storage. One example platform for long term storage of electronic data is magnetic storage tape. Magnetic storage tape, however, has limitations. One limitation of magnetic storage tape is that data stored on magnetic tape cannot be searched or manipulated as easily as data stored on other platforms, for example, semiconductor memory (e.g., integrated circuit based memories). Another limitation of magnetic storage tape is that it has a limited lifetime (e.g., 30 years) and many magnetic storage tapes are reaching the end of their lifetime. As such, enterprises with archives of magnetic storage tape need to transfer the stored data to another medium, or risk losing the data. Further, interfaces and software platforms for legacy electronic tape storage are often incompatible with contemporary interfaces and software platforms.

SUMMARY OF EXAMPLE EMBODIMENTS

According to embodiments of the present disclosure, disadvantages and problems associated with providing internal services to external enterprises may be reduced or eliminated.

In certain embodiments, a system for transferring archived data comprises one or more interfaces, each operable to read data from magnetic storage tape, and one or more processors communicatively coupled to the one or more interfaces and operable to: identify a file stored on a magnetic storage tape, the file having a first format, identify a date associated with the identified file, identify one from a plurality of intermediate platforms based at least in part on the identified date associated with the identified file, each of the plurality of intermediate platforms associated with a range of dates, the intermediate platforms operable to access data from file formats associated with the range of dates, transfer the identified file to the identified intermediate platform, the identified intermediate platform operable to access data from the first file format, access data in the identified file using the identified intermediate platform, transfer the accessed data from the identified intermediate platform to a contemporary platform, and store the accessed data in a second format.

Certain embodiments of the present disclosure may provide one or more technical advantages having specific technical effects.

In certain embodiments, a system is operable to read data from a plurality of magnetic storage tapes simultaneously for processing, thereby conserving the processing resources required to process the data from the magnetic storage tapes serially.

In particular embodiments, a system is operable to transfer archived data from a plurality of magnetic storage tapes to semiconductor memory, thereby conserving the processing resources required to search and manipulate the data on the magnetic storage tape.

In an embodiment, a system is operable alter the date and/or time associated with archived data from a plurality of magnetic storage tapes while transferring the data to semiconductor memory, thereby conserving the processing resources required to perform altering the date and/or time after the data is transferred.

In certain embodiments, a system accesses archived data from a plurality of magnetic storage tapes that are incompatible with contemporary platforms by using intermediate platforms that are compatible with both the plurality of magnetic storage tapes and the contemporary platforms, thereby preserving archived data that would otherwise be lost.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which:

FIG. 2 illustrates a table of an example system for transferring archived data.

DETAILED DESCRIPTION

Figure 1:
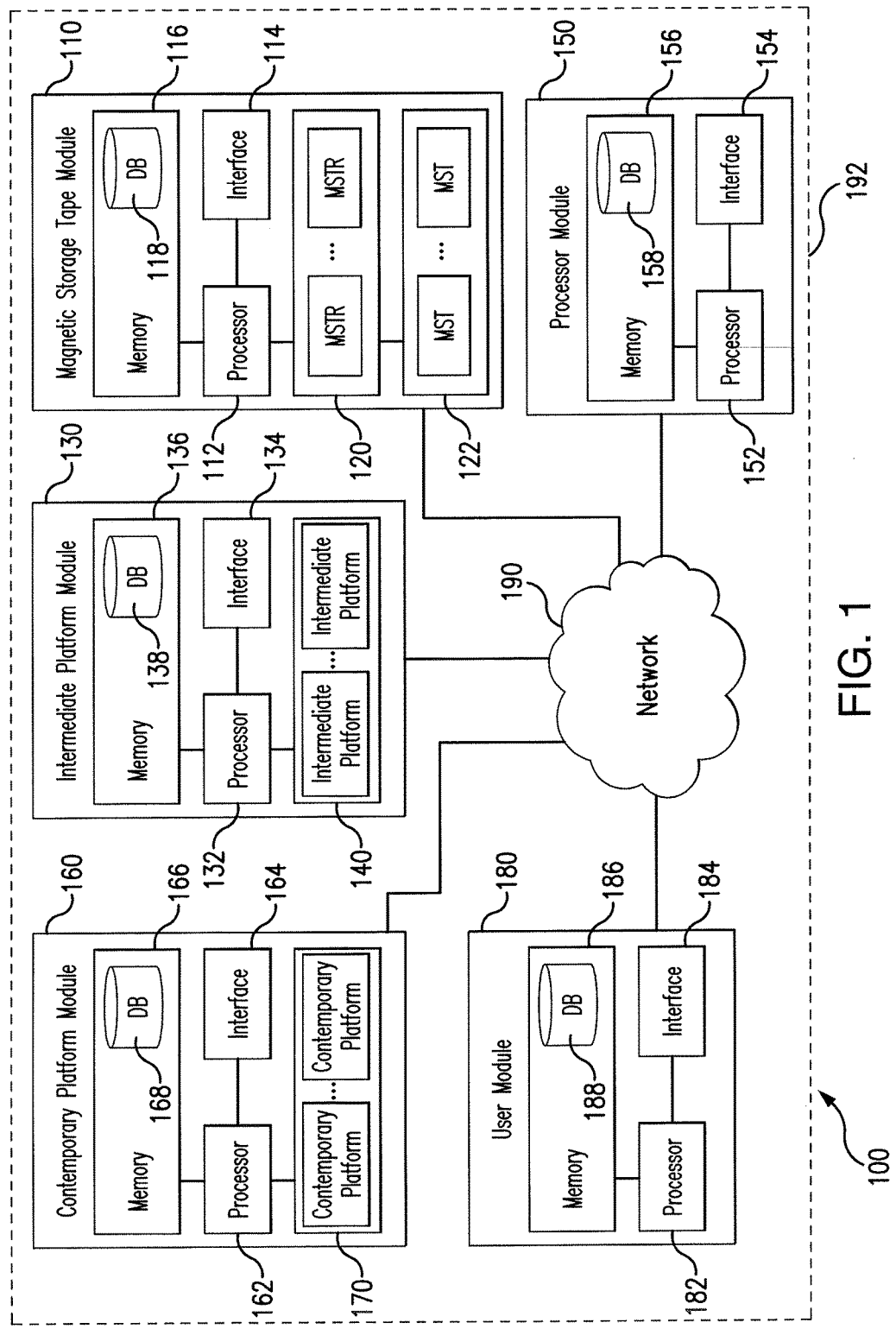
FIG. 1 illustrates an example system for transferring archived data.
Figure 3:
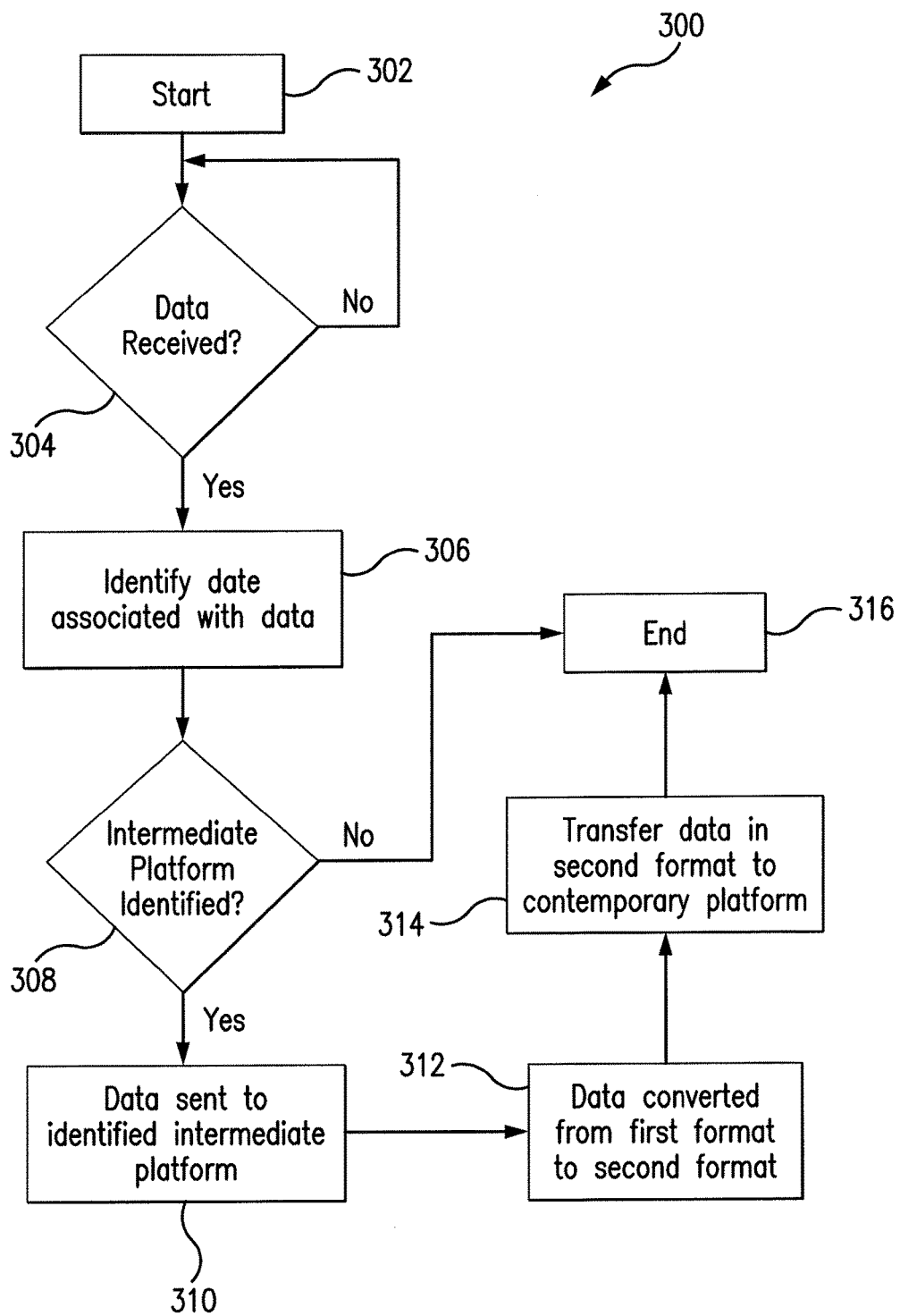
FIG. 3 illustrates a flow diagram of an example method for transferring archived data.

Embodiments of the present disclosure and its advantages are best understood by referring to FIGS. 1 through 3 of the drawings, like numerals being used for like and corresponding parts of the various drawings.

In an example embodiment of operation, an enterprise maintains a plurality of magnetic storage tapes containing archived data. For example, the enterprise may maintain archived daily financial transaction data in hundreds of thousands of magnetic storage tapes. The archived data may span many years and comprise a plurality of file formats and/or a plurality of physical formats of magnetic storage tapes (e.g., reel, cassette, or cartridge). The enterprise may need to transfer the data archived on magnetic storage tapes to contemporary electronic platforms. For example, the magnetic storage tapes may be nearing the end of their lifetime and the archived data may be at risk of being corrupted and/or lost, or enterprise may need to access the archived data and/or perform manipulations (e.g., searches and/or filters) on the archived data. Contemporary electronic platforms may not be able to access data archived on magnetic storage tapes, and/or magnetic storage tapes may not be able to perform the desired data manipulations.

The enterprise may use magnetic storage tape readers to access data archived on magnetic storage tapes. Data archived on magnetic storage tapes may be associated with a date and/or time (e.g., the date and/or time the data was stored). A plurality of intermediate platforms operable to access a plurality of file formats used to archive data on magnetic storage tapes may be used to access the data archived on the magnetic storage tapes. For example, a first intermediate platform may be compatible with file formats used between 1990 and 1998, a second intermediate platform may be compatible with file formats used between 1988 and 1995, and a third intermediate platform may be compatible with file formats used between 1984 and 1992. A processor may be operable to receive dates associated with data read from magnetic storage tapes by magnetic storage tape readers (e.g., 1996), identify intermediate platforms compatible with file formats used to store data on magnetic storage tapes in 1994 (e.g., the first intermediate platform), and to route the data to the identified intermediate platform.

Once the archived data has been routed to a compatible intermediate platform 140, the intermediate platform may convert the archived data from the original file format to a new file format, for example, a file format compatible with contemporary platforms. The processor may route the data from the intermediate platform to a contemporary platform. Once the data is stored in the contemporary platform, the data may be accessed and/or manipulated using the contemporary platform. Manipulations may include searching and/or filtering the data.

FIG. 1 illustrates an example system 100 for transferring archived data. According to an embodiment, system 100 includes magnetic storage tape module 110, including one or more magnetic storage tape readers 120 and more or more magnetic storage tapes 122, intermediate platform module 130, including one or more intermediate platforms 140, processor module 150, contemporary platform module 160, including one or more contemporary platforms 170, user module 180, network 190, and enterprise 192. In particular embodiments, enterprise 192 maintains magnetic storage tape module 110, including one or more magnetic storage tape readers 120 and more or more magnetic storage tapes 122, intermediate platform module 130, including one or more intermediate platforms 140, processor module 150, contemporary platform module 160, including one or more contemporary platforms 170, user module 180, and network 190.

Magnetic storage tape module 110 represents a component of system 100 operable to employ one or more magnetic storage tape readers 120 to read data from one or more magnetic storage tapes 122. In certain embodiments, magnetic storage tape module 110 includes one or more processors 112, interfaces 114, memories 116, and databases 118. Magnetic storage tape readers 120 represent interfaces operable to read data from magnetic storage tape 122. In an embodiment, magnetic storage tape module 110 further includes autoloaders operable to automatically load magnetic storage tapes 122 into magnetic storage tape readers 120, and to eject magnetic storage tapes 122 from magnetic storage tape readers 120. Magnetic storage tape readers 120 may operate in parallel, such that a plurality of magnetic storage tape readers 120 may read data from magnetic storage tapes 122 simultaneously.

Magnetic storage tapes 122 represent lengths of tape (e.g., a flexible plastic) with one or more sides coated with a ferromagnetic material and operable to store data. In certain embodiments, magnetic storage tapes 122 are sequential storage mediums where data is located by reading data records in front of the desired data to search for predefined partitions that identify the location of the desired data. Magnetic storage tapes 122 may contain a number of tracks that separate stored data. In particular embodiments, magnetic storage tapes 122 may be open reel, contained in cassettes or cartridges, or any other suitable format. As magnetic storage tapes 122 may be in different physical formats, magnetic storage tape readers 120 may include a plurality of different interfaces operable to accommodate magnetic storage tapes 122 of different physical formats. In certain embodiments, data stored on magnetic storage tapes 122 is identified by a date and/or time (e.g., the date and/or time the data was stored). Multiple sets of data may be stored on the tape at the same time and, accordingly, may be identified by the same date and/or time while still representing distinct sets of data.

Intermediate platform module 130 represents a component of system 100 operable to interface between magnetic storage tape module 110 and contemporary platform module 160. In certain embodiments, intermediate platform module 130 includes one or more processors 132, interfaces 134, memories 136, and databases 138. Intermediate platform module 130 may include one or more intermediate platforms 140. Intermediate platforms 140 represent hardware and/or software platforms operable to interface with magnetic storage tape module 110 and contemporary platform module 160. For example, magnetic storage tape readers 120 and/or magnetic storage tapes 122 may not be compatible with hardware and/or software of contemporary platforms 170. In certain embodiments, data stored on magnetic storage tapes 122 is in one or more formats that are not accessible by contemporary platforms 170. Intermediate platforms 140 may be operable to interface with one or more of: magnetic storage tape readers 120, magnetic storage tapes 122, file formats used to store data on magnetic storage tapes 122, and contemporary platforms 170. In particular embodiments, data stored on magnetic storage tapes 122 include date information operable to identify the time period the data was stored (e.g., the date the data was stored on magnetic storage tape 122). This date information may be used (e.g., by processor module 150) to identify intermediate platforms 140 compatible with one or more of: file formats used to store data on magnetic storage tape 122, magnetic storage tape readers 120 operable to read magnetic storage tapes 122, and contemporary platforms 170.

In an embodiment, if a single intermediate platform 140 is not compatible with contemporary platforms 140 and one or more of: magnetic storage tape 122, magnetic storage tape readers 120, or file formats used to store data on magnetic storage tapes 122, a plurality of intermediate platforms 140 may be connected serially to bridge compatibility between contemporary platforms 170 and one or more of: magnetic storage tape 122, magnetic storage tape readers 120, or file formats used to store data on magnetic storage tapes 122. For example, a first intermediate platform 140 compatible with one or more of: magnetic storage tape 122, magnetic storage tape readers 120, or file formats used to store data on magnetic storage tapes 122 and compatible with a second intermediate platform 140 that is compatible with contemporary platforms 170 may be connected together.

Processor module 150 represents a component of system 100 operable to identify intermediate platforms 140 compatible with one or more of: magnetic storage tape 122, magnetic storage tape readers 120, or file formats used to store data on magnetic storage tapes 122, and/or to route data read by magnetic storage readers 120 from magnetic storage tapes 122 to the identified intermediate platform 140. In certain embodiments, processor module 150 includes one or more processors 152, interfaces 154, memories 156, and databases 158. Processor module 150 may use information (e.g., dates) associated with data stored on magnetic tapes 122 to identify intermediate platforms 140 compatible with one or more of: magnetic storage tape 122, magnetic storage tape readers 120, or file formats used to store data on magnetic storage tapes 122.

For example, a first intermediate platform 140 may be compatible with file formats used between 1990 and 1998, a second intermediate platform 140 may be compatible with file formats used between 1988 and 1995, and a third intermediate platform may be compatible with file formats used between 1984 and 1992. Processor module 150 may be operable to receive dates associated with data read from magnetic storage tapes 122 by magnetic storage tape readers 120 (e.g., 1996), identify intermediate platforms 140 compatible with file formats used to store data on magnetic storage tapes 122 in 1994 (e.g., the first intermediate platform 140), and to route the data to the identified intermediate platform 140. In certain embodiments, if multiple intermediate platforms 140 are compatible with a file format, processor module 150 may use load balancing techniques to identify intermediate platform 140 to which to route the data.

In an embodiment, processor module 150 is operable to alter dates and/or times associated with data read from magnetic storage tapes 122. For example, distinct data sets may be associated with the same date and/or time. To avoid distinct data sets being associated with the same date and time, processor module may alter the time associated with one of the two data sets to differentiate the two data sets. For example, processor module 150 may alter the time associated with one of the two data sets (e.g., milliseconds) so they can be distinguished.

Contemporary platform module 160 represents a component of system 100 operable to receive data from intermediate platforms 140 that have been read from magnetic storage tapes 122. In certain embodiments, contemporary platform module 160 includes one or more processors 162, interfaces 164, memories 166, and databases 168. Contemporary platform module 160 may include one or more contemporary electronic platforms 170. Contemporary platforms 170 represent hardware and/or software platforms operable to interface with intermediate platforms 140. In certain embodiments, contemporary platforms 170 represent contemporary hardware and/or software platforms employed by enterprise 192 that need access to data archived on magnetic storage tapes. For example, enterprise 192 may have stored daily electronic data on a plurality of magnetic storage tapes 122. In certain embodiments, this data may relate to financial transactions and/or records and may be required by a regulatory authority to be maintained. The number of magnetic storage tapes maintained by enterprise 192 may number in the hundreds of thousands. In such embodiments, contemporary platforms 170 with contemporary hardware and/or software may need access to the data archived on magnetic storage tapes 122. For example, data manipulation (e.g., searching and/or filtering) can be difficult or impossible one magnetic storage tapes 122. However, contemporary platforms 170, which may use high performance semiconductor memories (e.g., integrated circuit memories), may be operable to perform these data manipulations.

User module 180 represents a component of system 100 operable to provide a user interface to access and/or control components of system 100, including magnetic storage tape module 110, intermediate platform module 130, processor module 150, and contemporary platform module 160. In certain embodiments, user module 180 includes one or more processors 182, interfaces 184, memories 186, and databases 188. User module 180 may allow users of system 100 to access, manage, and/or control the flow of data from magnetic storage tapes 122, to magnetic storage tape readers 120, to intermediate platforms 150, and to contemporary platforms 170.

Network 190 represents any suitable network operable to facilitate communication between components of system 100, such as magnetic storage tape module 110, including one or more magnetic storage tape readers 120 and more or more magnetic storage tapes 122, intermediate platform module 130, including one or more intermediate platforms 140, processor module 150, contemporary platform module 160, including one or more contemporary platforms 170, user module 180, and network 190. Network 190 may include any interconnecting system capable of transmitting audio, video, electrical signals, optical signals, data, messages, or any combination of the preceding. Network 190 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100.

Enterprise 192 represents an entity that maintains and/or operates magnetic storage tape module 110, including one or more magnetic storage tape readers 120 and more or more magnetic storage tapes 122, intermediate platform module 130, including one or more intermediate platforms 140, processor module 150, contemporary platform module 160, including one or more contemporary platforms 170, user module 180, and network 190. Enterprise 192 may be any suitable type of business entity. In certain embodiments, enterprise 192 has different business units or subdivisions that handle different business activities. Different subdivisions of enterprise 192 may maintain and/or operate one or more of magnetic storage tape module 110, including one or more magnetic storage tape readers 120 and more or more magnetic storage tapes 122, intermediate platform module 130, including one or more intermediate platforms 140, processor module 150, contemporary platform module 160, including one or more contemporary platforms 170, user module 180, and network 190. In particular embodiments, enterprise 192 may include organizations such as commercial banks, savings and loan associations, credit unions, Internet banks, mutual fund companies, brokerage firms, credit card companies, or other provider of electronic transaction services.

A module (e.g., modules 110, 130, 150, 160, and 180) may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of a module may be performed by any suitable combination of one or more servers or other components at one or more locations. In embodiments where modules represent a server, the server may be a private server, and the server may be a virtual or physical server. Additionally, a module may include any suitable component that functions as a server.

Components of system 100, such as magnetic storage tape module 110, intermediate platform module 130, processor module 150, contemporary platform module 160, and user module 180, may include one or more processors. A processor represents any computing device, such as processors 112, 132, 152, 162, and 182, configured to control the operation of one or more components of system 100. A processor may comprise one or more processors and may be a programmable logic device, a microcontroller, a microprocessor, any suitable processing device, or any suitable combination of the preceding. A processor includes any hardware or software that operates to control and process information received by a component of system 100. In certain embodiments, a processor communicatively couples to other components of system 100, such as a module (e.g., modules 110, 130, 150, 160, and 180), an interface (e.g., interfaces 114, 134, 154, 164, and 184), a memory (e.g., memories 116, 136, 156, 166, and 186), a database (e.g., databases 118, 138, 158, 168, and 188), or any other suitable component.

An interface represents any device, such as interfaces 114, 134, 154, 164, and 184 operable to receive input, send output, process the input or output, or perform other suitable operations for a component of system 100. An interface includes any port or connection, real or virtual, including any suitable hardware or software, including protocol conversion and data processing capabilities, to communicate through network 190. In certain embodiments, an interface includes a user interface (e.g., physical input, graphical user interface, touchscreen, buttons, switches, transducer, or any other suitable method to receive input from a user).

A memory represents any device, such as memories 116, 136, 156, 166, and 186, operable to store, either permanently or temporarily, data, operational software, or other information for a processor. Memory includes any one or a combination of volatile or non-volatile local or remote devices suitable for storing information. For example, a memory may include random access memory (RAM), read only memory (ROM), magnetic storage devices, optical storage devices, semiconductor storage devices, or any other suitable information storage device or a combination of these devices. A memory may include any suitable information for use in the operation of component of system 100. A memory may further include some or all of one or more databases (e.g., databases 118, 138, 158, 168, and 188).

Logic may perform the operation of any component of system 100, for example, logic executes instructions to generate output from input. Logic may include hardware, software, or other logic. Logic may be encoded in one or more non-transitory, tangible media, such as a computer-readable medium or any other suitable tangible medium, and may perform operations when executed by a computer or processor. Certain logic, such as a processor, may manage the operation of a component.

In an embodiment of operation, enterprise 192 maintains a plurality of magnetic storage tapes 122 containing archived data. For example, enterprise 192 may maintain archived daily financial transaction data in hundreds of thousands of magnetic storage tapes 122. The archived data may span many years and comprise a plurality of file formats used to store data and/or a plurality of physical formats of magnetic storage tapes 122. In an embodiment, enterprise 192 needs to transfer the data archived on magnetic storage tapes 122 to contemporary platforms 170. For example, magnetic storage tapes 122 may be nearing the end of their lifetime and the archived data may be at risk of being corrupted and/or lost, or enterprise 192 may need to access the archived data and/or perform manipulations (e.g., searches and/or filters) on the archived data. Contemporary platforms 170 may not be able to access data archived on magnetic storage tapes 122, and/or magnetic storage tapes 122 may not be able to perform the desired data manipulations.

In certain embodiments, magnetic storage tape readers 120 access data archived on magnetic storage tapes 122. Magnetic storage tapes 122 may be in a plurality of physical formats (e.g., reel, cassette, cartridge, or other suitable format) and a plurality of magnetic storage tape readers 120 may be employed that are compatible with the various physical formats of magnetic storage tapes 122. Data archived on magnetic storage tapes 122 may be associated with a date and/or time (e.g., the date and time the data was stored). In an embodiment, magnetic storage tape readers 120 are connected in parallel to allow for a plurality of magnetic storage tape readers 120 to simultaneously access data from a plurality of magnetic storage tapes 122. System 100, for example magnetic storage tape module 110, may employ autoloaders to load and unload magnetic storage tape readers 120 with magnetic storage tapes 122.

In an embodiment, processor module 150 is operable to alter dates and/or times associated with data read from magnetic storage tapes 122. For example, distinct data sets may be associated with the same date and/or time. To avoid distinct data sets being associated with the same date and time, processor module may alter the time associated with one of the two data sets to differentiate the two data sets. For example, processor module 150 may alter the time associated with a data set (e.g., milliseconds). Altering dates and/or times associated with archived data is discussed in more detail with respect to FIG. 2.

Intermediate platform module 130 may include a plurality of intermediate platforms 140 operable to access a plurality of file formats used to archive data on magnetic storage tapes 122. For example, a first intermediate platform 140 may be compatible with file formats used between 1990 and 1998, a second intermediate platform 140 may be compatible with file formats used between 1988 and 1995, and a third intermediate platform may be compatible with file formats used between 1984 and 1992. Processor module 150 may be operable to receive dates associated with data read from magnetic storage tapes 122 by magnetic storage tape readers 120 (e.g., 1996), identify intermediate platforms 140 compatible with file formats used to store data on magnetic storage tapes 122 in 1994 (e.g., the first intermediate platform 140), and to route the data to the identified intermediate platform 140. In certain embodiments, if multiple intermediate platforms 140 are compatible with a file format, processor module 150 may use load balancing techniques to identify intermediate platform 140 to which to route the data.

Once the archived data has been routed to a compatible intermediate platform 140, intermediate platform 140 may convert the archived data from the original file format to a new file format, for example, a file format compatible with contemporary platforms 170. In an embodiment, processor module 150 routes the data from intermediate platform 140 to contemporary platform 170. Once the data is stored in in contemporary platform 170, the data may be accessed and/or manipulated using contemporary platform 170. Manipulations may include searching and/or filtering the data. In certain embodiments, the data is stored in semiconductor memory (e.g., integrated circuit based memory) at contemporary platform 170.

Modifications, additions, or omissions may be made to system 100. System 100 may include more, fewer, or other components. Any suitable component of system 100 may include a processor, interface, logic, memory, or other suitable element.

FIG. 2 illustrates a table 200 of an example system for transferring archived data. Table 200 represents date and time information associated with data sets archived in magnetic storage tapes 122. Table 200 includes date column 202, time column 204, and rows 206, 208, and 210 illustrating examples of date and time information associated with data sets archived in magnetic storage tape 122. Date column 202 represents date information associated with data sets archived in magnetic storage tape 122. Time column 204 represents time information associated with data sets archived in magnetic storage tape 122. Date and time information stored in date column 202 and time column 204 may represent the date and time the data sets were stored in magnetic storage tape 122.

Row 206 contains 10/05/1990 in date column 202 and 17:15:05 in time column 204. Row 208 contains 10/6/1990 in date column 202 and 17:17:19 in time column 204. Row 210 contains 10/06/1990 in date column 202 and 17:17:19 in time column 204. Rows 208 and 210 are associated with distinct data sets, however, they are associated with identical dates and times. In order to distinguish between the two distinct data sets associated with rows 208 and 210, processor module 150 may alter the time associated with one of the two data sets. For example, processor module 150 may alter time column 204 in row 210 from 17:17:19 to 17:17:19.001 and maintain time column 204 in row 208 at 17:17:19. Accordingly, the data sets associated with rows 208 and 210 can be distinguished by the date and time columns 202 and 204.

By only altering time column 204 by a fraction of a second (e.g., milliseconds), processor module 150 is still able to identify the appropriate intermediate platform 140 to process the data set associated with row 210, and to still identify time originally associated with the data set. In certain embodiments, the data in either date column 202 and/or time column 204 may be altered to differentiate between data sets.

Modifications, additions, or omissions may be made to system 200. System 200 may include more, fewer, or other components. Any suitable component of system 200 may include a processor, interface, logic, memory, or other suitable element.

FIG. 3 illustrates a flow diagram of an example method 300 for transferring archived data, according to certain embodiments of the present disclosure. Method 300 begins at step 302. At step 304, it is determined whether data has been received, for example, from magnetic storage tape readers 120. If data has not been received, method 300 returns to step 304. If data has been received, method 300 continues to step 306 and a date and/or time associated with the received data is identified. At step 308, it is determined (e.g., by processor module 150) which of a plurality of intermediate platforms 140 are compatible with file formats associated with date associated with the received data. If no intermediate platform 140 is identified, the method ends at step 314. If an intermediate platform 140 is identified, method 300 continues to step 310. At step 310, the data is sent to the identified intermediate platform 140. At step 312, the intermediate platform converts the data from the original file format to a file format compatible with one or more of contemporary platforms 170. At step 314 the data is transferred to one of the contemporary platforms 170 and stored. Method 300 ends at step 316.

Modifications, additions, or omissions may be made to method 300. The method may include more, fewer, or other steps. Additionally, steps may be performed in any suitable order, in parallel, and/or sequentially. Any suitable component of may perform one or more steps of method 300.

According to embodiments of the present disclosure, disadvantages and problems associated with providing internal services to external enterprises may be reduced or eliminated. Certain embodiments of the present disclosure may provide one or more technical advantages having specific technical effects.

In certain embodiments, a system is operable to read data from a plurality of magnetic storage tapes simultaneously for processing, thereby conserving the processing resources required to process the data from the magnetic storage tapes serially.

In particular embodiments, a system is operable to transfer archived data from a plurality of magnetic storage tapes to semiconductor memory, thereby conserving the processing resources required to search and manipulate the data on the magnetic storage tape.

In an embodiment, a system is operable alter the date and/or time associated with archived data from a plurality of magnetic storage tapes while transferring the data to semiconductor memory, thereby conserving the processing resources required to perform altering the date and/or time after the data is transferred.

In certain embodiments, a system is access archived data from a plurality of magnetic storage tapes that are incompatible with contemporary platforms using intermediate platforms that are compatible with both the plurality of magnetic storage tapes and contemporary platforms, thereby conserving archived data that would otherwise be lost.

Other technical advantages of the present disclosure will be readily apparent to one skilled in the art from the following figures, descriptions, and claims. Moreover, while specific advantages have been enumerated above, various embodiments may include all, some, or none of the enumerated advantages.

What is claimed is:

1. A system for transferring archived data, comprising:
a plurality of interfaces, each operable to read data from a magnetic storage tape; and
one or more processors communicatively coupled to the plurality of interfaces and operable to:
identify a file stored on a magnetic storage tape from one of the plurality of interfaces, the file having a first format;
identify a date and time associated with the identified file;
compare the date and time associated with the identified file to a list of dates and times of previously identified files;
determine that the date and time associated with the identified file exists on the list of previously identified files;
alter the time associated with the identified file to an alternate time;
add the date and altered time of the identified file to the list of previously identified files;
identify one from a plurality of intermediate platforms based at least in part on the identified date associated with the identified file, each of the plurality of intermediate platforms associated with a range of dates, the intermediate platforms operable to access data from file formats associated with the range of dates;
transfer the identified file to the identified intermediate platform, the identified intermediate platform operable to access data from the first file format;
access data in the identified file using the identified intermediate platform;

transfer the accessed data from the identified intermediate platform to a contemporary platform; and
store the accessed data in a second format, the contemporary platform operable to access data in the second file format but not the first file format.

2. A system for transferring archived data, comprising:
one or more interfaces, each operable to read data from magnetic storage tape;
and one or more processors communicatively coupled to the one or more interfaces and operable to:
identify a file stored on a magnetic storage tape, the file having a first format;
identify a date associated with the identified file;
identify one from a plurality of intermediate platforms based at least in part on the identified date associated with the identified file, each of the plurality of intermediate platforms associated with a range of dates, the intermediate platforms operable to access data from file formats associated with the range of dates;
transfer the identified file to the identified intermediate platform, the identified intermediate platform operable to access data from the first file format;
access data in the identified file using the identified intermediate platform;
transfer the accessed data from the identified intermediate platform to a contemporary platform; and
store the accessed data in a second format.

3. The system of claim 2, the one or more processors further operable to:
identify a time associated with the identified file;
compare the date and time associated with the identified file to a list of dates and times of previously identified files;
determine that the date and time associated with the identified file exists on the list of previously identified files;
alter the time associated with the identified file to an alternate time; and
add the date and altered time of the identified file to the list of previously identified files.

4. The system of claim 3, wherein the time is altered by a fraction of a second from the identified time.

5. The system of claim 2, wherein the contemporary platform is operable to access data in the second file format but not the first file format.

6. The system of claim 2, wherein the one or more interfaces comprise a plurality of interfaces, each of the plurality of interfaces reading data from a magnetic storage tape, and the data read from each of the plurality of interfaces accessed by the one or more processors in parallel streams.

7. The system of claim 2, wherein the first file format is a Teradata file format.

8. The system of claim 2, the one or more processors further operable to store the accessed data in the second file format in semiconductor memory.

9. A non-transitory computer readable medium comprising logic for transferring archived data, the logic when executed by a processor operable to:
receive data read from a magnetic storage tape by one or more interfaces;
identify, by one or more processors, a file read from the magnetic storage tape, the file having a first format;
identify, by the one or more processors, a date associated with the identified file;
identify, by the one or more processors, one from a plurality of intermediate platforms based at least in part on the identified date associated with the identified file, each of the plurality of intermediate platforms associated with a range of dates, the intermediate platforms operable to access data from file formats associated with the range of dates;
transfer, by the one or more processors, the identified file to the identified intermediate platform, the identified intermediate platform operable to access data from the first file format;
access, by the one or more processors, data in the identified file using the identified intermediate platform;
transfer, by the one or more processors, the accessed data from the identified intermediate platform to a contemporary platform; and
store, by the one or more processors, the accessed data in a second format.

10. The non-transitory computer readable medium of claim 9, the logic further operable to:
identify, by the one or more processors, a time associated with the identified file;
compare, by the one or more processors, the date and time associated with the identified file to a list of dates and times of previously identified files;
determine, by the one or more processors, that the date and time associated with the identified file exists on the list of previously identified files;
alter, by the one or more processors, the time associated with the identified file to an alternate time; and
add, by the one or more processors, the date and altered time of the identified file to the list of previously identified files.

11. The non-transitory computer readable medium of claim 9, wherein the contemporary platform is operable to access data in the second file format but not the first file format.

12. The non-transitory computer readable medium of claim 9, wherein the one or more interfaces comprise a plurality of interfaces, each of the plurality of interfaces reading data from a magnetic storage tape, and the data read from each of the plurality of interfaces accessed by the one or more processors in parallel streams.

13. The non-transitory computer readable medium of claim 9, wherein the first file format is a Teradata file format.

14. The non-transitory computer readable medium of claim 9, the logic further operable to store the accessed data in the second file format in semiconductor memory.

15. A method for transferring archived data, comprising:
receiving data read from a magnetic storage tape by one or more interfaces;
identifying, by one or more processors, a file read from the magnetic storage tape, the file having a first format;
identifying, by the one or more processors, a date associated with the identified file;
identifying, by the one or more processors, one from a plurality of intermediate platforms based at least in part on the identified date associated with the identified file, each of the plurality of intermediate platforms associated with a range of dates, the intermediate platforms operable to access data from file formats associated with the range of dates;
transferring, by the one or more processors, the identified file to the identified intermediate platform, the identified intermediate platform operable to access data from the first file format;

accessing, by the one or more processors, data in the identified file using the identified intermediate platform;

transferring, by the one or more processors, the accessed data from the identified intermediate platform to a contemporary platform; and storing, by the one or more processors, the accessed data in a second format.

16. The method of claim 15, further comprising:

identifying, by the one or more processors, a time associated with the identified file;

comparing, by the one or more processors, the date and time associated with the identified file to a list of dates and times of previously identified files;

determining, by the one or more processors, that the date and time associated with the identified file exists on the list of previously identified files;

altering, by the one or more processors, the time associated with the identified file to an alternate time; and adding, by the one or more processors, the date and altered time of the identified file to the list of previously identified files.

17. The method of claim 15, wherein the contemporary platform is operable to access data in the second file format but not the first file format.

18. The method of claim 15, wherein the one or more interfaces comprise a plurality of interfaces, each of the plurality of interfaces reading data from a magnetic storage tape, and the data read from each of the plurality of interfaces accessed by the one or more processors in parallel streams.

19. The method claim 15, wherein the first file format is a Teradata file format.

20. The method claim 15, the logic further comprising storing the accessed data in the second file format in semiconductor memory.

* * * * *